US005746105A

United States Patent [19]

Suzuki et al.

[11] Patent Number: 5,746,105

[45] Date of Patent: May 5, 1998

[54] BREAD SLICER

[75] Inventors: Tomosaburo Suzuki, Kanagawa-ken; Sanji Kawakami, Kodaira, both of Japan

[73] Assignee: Daisey Kikai Co., Ltd., Tokyo, Japan

[21] Appl. No.: 734,130

[22] Filed: Oct. 21, 1996

Related U.S. Application Data

[63] Continuation of Ser. No. 215,570, Mar. 22, 1994, abandoned.

[30] Foreign Application Priority Data

| | | | |
|---|---|---|---|
| Mar. 23, 1993 | [JP] | Japan | 5-103434 |
| Aug. 23, 1993 | [JP] | Japan | 5-241925 |

[51] Int. Cl.[6] B23D 53/00

[52] U.S. Cl. 83/804; 83/425.4; 83/807; 83/808; 83/820; 83/932

[58] Field of Search 83/932, 651.1, 83/820, 171, 808, 425.4, 804, 807, 499, 751

[56] References Cited

U.S. PATENT DOCUMENTS

| | | | |
|---|---|---|---|
| 2,110,290 | 3/1938 | Criner | 83/804 |
| 2,126,987 | 8/1938 | Criner | 83/804 |
| 2,293,083 | 8/1942 | Schlemmer | 83/804 |
| 2,696,253 | 12/1954 | Hartman | 83/808 |
| 3,461,764 | 8/1969 | Benith | 83/808 |
| 3,757,617 | 9/1973 | Fabbri | 83/171 X |
| 4,031,790 | 6/1977 | Arvidsson | 83/425.4 |
| 4,274,389 | 6/1981 | White et al. | 83/820 X |
| 4,574,675 | 3/1986 | Hallstrom | 83/820 X |
| 4,608,893 | 9/1986 | Huhne | 83/651.1 X |
| 4,850,844 | 7/1989 | Hunting | 83/171 X |

FOREIGN PATENT DOCUMENTS

| | | | |
|---|---|---|---|
| 616876 | 9/1994 | European Pat. Off. | 83/932 |
| 2 234 668 | 2/1991 | United Kingdom | 83/651.1 |

*Primary Examiner*—Kenneth E. Peterson

*Attorney, Agent, or Firm*—Oblon, Spivak, McClelland, Maier & Neustadt, P.C.

[57] ABSTRACT

A bread slicer using endless blades, in which finger holders holding fingers are provided for guiding the endless blades so as to position the blades quickly and accurately. A plurality of endless blades are stretched between a pair of drums and fingers are provided, each finger having engagement pieces for guiding each of the endless blades in engagement therewith so as to position the blades, and each finger is held on a finger holder. The finger holders 1 are slidably positioned on guide bars 2. A spacer shaft is disposed parallel to the guide bars, and rows of plural spacers which are different in terms of width are attached on the spacer shaft. By rotating the spacer shaft, selected rows of spacers can be made to intervene between the finger holders 1. The spacer shaft 5 is rotated after being shifted by an air cylinder. By clamping the finger holders from both sides thereof so as to be fixed after the spacers are positioned to intervene between the finger holders 1, the finger holders are held in place, with intervals between the holders corresponding to the width of the spacers. Thus, the endless blades are guided by the spacers kept at such intervals, and a loaf of bread is sliced in a desired manner.

5 Claims, 6 Drawing Sheets

BREAD SLICER

This application is a Continuation of application Ser. No. 08/215,570, filed Mar. 22, 1994, now abandoned.

BACKGROUND OF THE INVENTION (1) Technical Field

The present invention relates to a bread slicer for slicing a loaf of bread to a desired thickness by use of endless blades.

(2) Background Technology

After baking, a loaf of bread is sliced at a predetermined thickness so as to provide four, six or eight slices per pound, and then packaged as a product.

A bread slicer which carries out such operation automatically is constructed, as shown in FIG. 5, such that a plurality of endless blades B are caused to travel as crossingly stretched around drums D1 and D2 spacedly disposed in parallel and a loaf of bread P is laterally conveyed toward these endless blades B as shown by an arrow, wherein the bread is sliced to a predetermined number by the edges of these blades B.

For the purpose of slicing a loaf of bread to a predetermined number by use of the endless blades B as mentioned above, these endless blades B are set at given intervals, and it is also necessary to hold the travelling blades B at predetermined intervals. In order to hold the endless blades B at these intervals, as shown in FIG. 5, a device is used such that the endless blade B is made to pass between a plurality of fingers 4 each having engagement pieces 3 supported on a holder 1.

For regulating the position of this finger holders 1, there have hitherto been devised various constructions.

In an apparatus disclosed, for instance in Japanese Patent Application No. 329,430/1991 which the applicant proposed, as shown in FIG. 6, a finger holder 1 is movably held along guide bars 2, a guide 26 is disposed parallel to the guide bars 2 and an engaging member 27 which can be freely engaged or disengaged with said guide 26 is attached on the holder 1. When the engaging member 27 gets engaged with the guide 26, the holder 1 is not permitted to move and is therefore positioned at that position. Further, a screw rod 31 is disposed parallel to the guide bars 2 and a nut member 32 is screw-engaged with the same screw rod 31. On the nut member 32 is provided a turning member 35 which is turned by an air cylinder 36. By means of this turning member 35, the engaging member 27 is released from its engagement with the guide 26, whereby the holder 1 gets movable along the guide bars 2.

When the screw rod 31 is rotated to move the nut member 32 under such a condition that the finger holder 1 is made movable along the guide bars 2, the holder 1 is moved so as to be properly positioned. This device is advantageous because it can be operated in a reliable manner and can hold the finger holders freely at desired intervals. In this device, however, it is necessary to set the intervals of the finger holders on a control panel, and it is further necessary to take a considerably longer period of time for positioning all the finger holders because they must be separately positioned.

SUMMARY OF THE INVENTION

It is therefore an object of the present invention to provide a bread slicer of a simple structure, in which the positioning of the finger holders can be accurately carried out quickly and the change of this positioning can be easily carried out.

In order to solve the aforementioned problems in a bread slicer which comprises a plurality of endless blades stretched over two spaced drums for slicing a loaf of bread, and fingers respectively attached on finger holders movably supported along guide bars parallel to said drums for guiding each of said endless blades so as to position the same blade, according to the present invention, there is adopted a construction having: springs which respectively to intervene between the finger holders, each of which biases the adjacent finger holders so as to space them from each other; a finger interval holding member having rows of spacers which differ in terms of spacing from one another, which are attached on a rotatable spacer shaft parallel to said guide bars and are held between the adjacent finger holders so as to hold the mutual intervals of finger holders; and a finger holder fixing device for clamping the finger holders from both sides.

If the finger holder fixing device for clamping the finger holders from both the sides is released, the respective finger holders will be separated almost at equal intervals from each other by the spring made to intervene between the adjacent holders because the aforementioned construction is adopted in the bread slicer according to the present invention.

If one row of spacers having to be held for the finger holders is selected among the rows of spacers of the finger interval holding member under this situation, and then inserted between the finger holders which have been separated as mentioned above, and the finger holders are then clamped from both sides by means of the finger holder fixing device, these finger holders can quickly have the spacers inserted there between.

By releasing the finger holder fixing device from one set of spacers and engaging the finger holders with a different set of spacers width in which an interval somewhat larger than an interval that is about to set is held between the respective finger, the width of the finger holder fixing device can be made smaller, whereby a period of time required for setting the intervals of the finger holders can be shortened.

In the bread slicer according to the present invention, the spacers thereof are preferably put slightly displaceably placed on the spacer shaft, not fixed thereon, because the clamping of the finger holders by the finger holder fixing device can be firmly carried out when they are clamped from both the sides, with the spacers respectively made to intervene between the adjacent finger holders.

Furthermore, the bread slicer according to the present invention may be constructed such that the spacer shaft is made shiftable so as not to collide with the finger holders when rotated. In addition, in the bread slicer according to the present invention, a two-stage air cylinder may be used as the finger holder fixing device.

If the finger holders at the end portion, supported on the guide bars, are held with intervals corresponding to the maximum number of bread slices, with no spring between them, and these finger holders are made displaceable as one body, this construction will be also advantageous in reducing the width of the apparatus and shortening the period of time required for operating the change of the interval of finger holders.

In the present invention, furthermore, the finger holders at both end sides of said drums for the blades which will be used only when a loaf of bread is sliced to the maximum number of bread slices, may be made up in a combined structure. If some finger holders at both ends of the drums for the blades are used only for providing the maximum number of bread slices which are made in a combined structure as mentioned above are adopted, the mechanism and operation of the bread slicer will become very simple because these finger holders in the united structure can be moved as one body when displaced.

In addition, if the spacer shaft is made exchangeable with another spacer shaft, the interval of the finger holders can be preferably variously regulated.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

The bread slicer according to the present invention will be now be described in accordance with one preferred embodiment illustrated in FIGS. 1 to 4.

Figure 1:
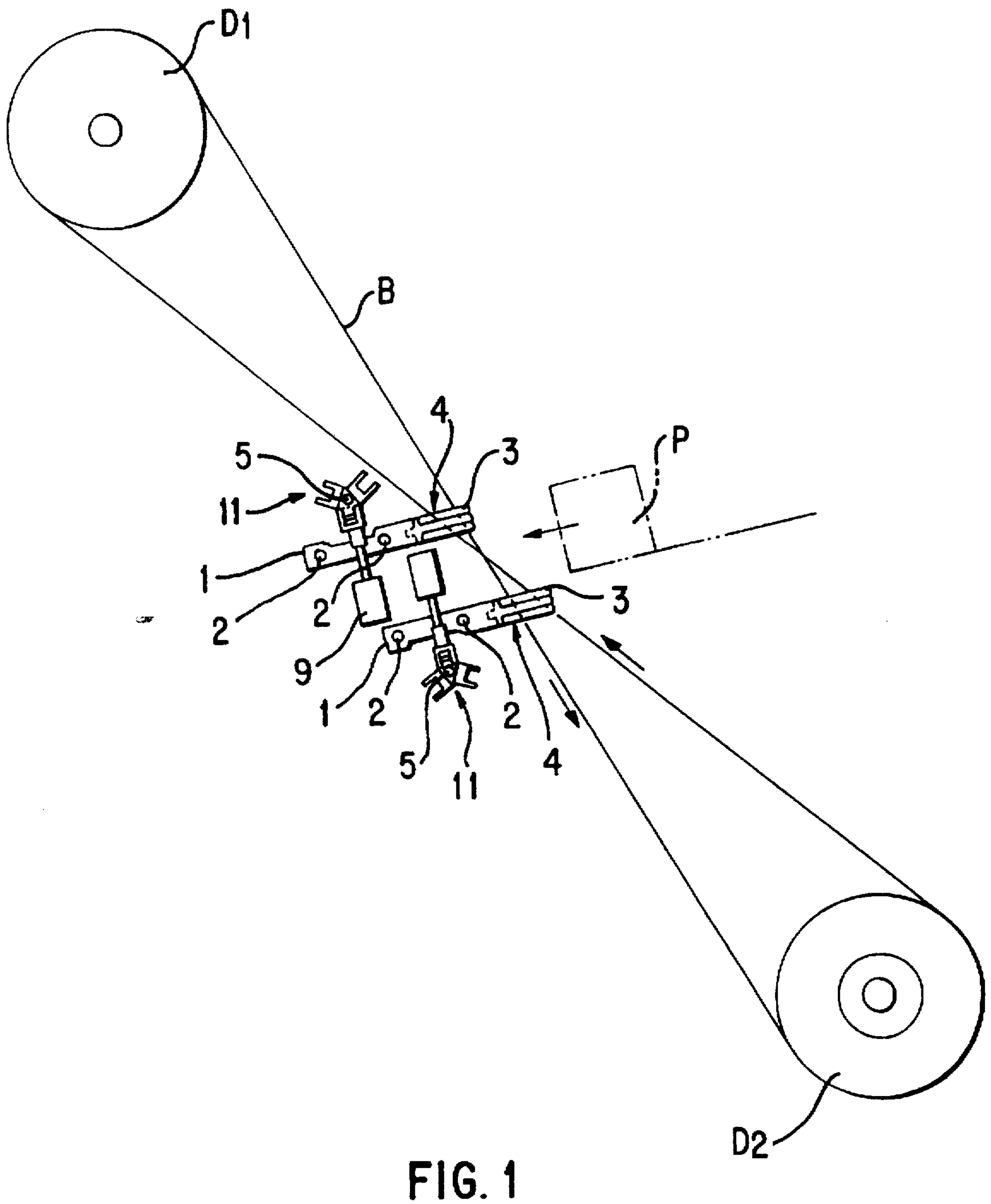
FIG. 1 is a side view showing the entire construction of the bread slicer according to one preferred embodiment of the present invention

The illustrated apparatus has a plurality of endless blades B for slicing a loaf of bread P, which are stretched over two drums D1 and D2 spaced as shown in FIG. 1. Reference numeral 1 designates a finger holder equipped with a finger 4 having three engagement pieces 3 for guiding each of the endless blades B so as to position the same blade. The finger holder 1 is supported movably along guide bars 2 disposed in parallel to the drums D1 and D2.

In fact, a plurality of the finger holders 1 are spacedly disposed along the guide bars 2 in a direction perpendicular to the drawing. To each row of the finger holders 1, one spacer shaft 5 is rotatably disposed parallel to the drums D1 and D2. On each spacer shaft 5, as enlargedly shown in FIG. 2, there is attached a row of spacers for holding the interval between the respective finger holders 1, which spacers intervene between adjacent finger holders 1. In the illustrated apparatus, the spacer shaft 5 has three rows of spacers 6, 7 and 8, each attached at an interval of 120°.

Figure 2:
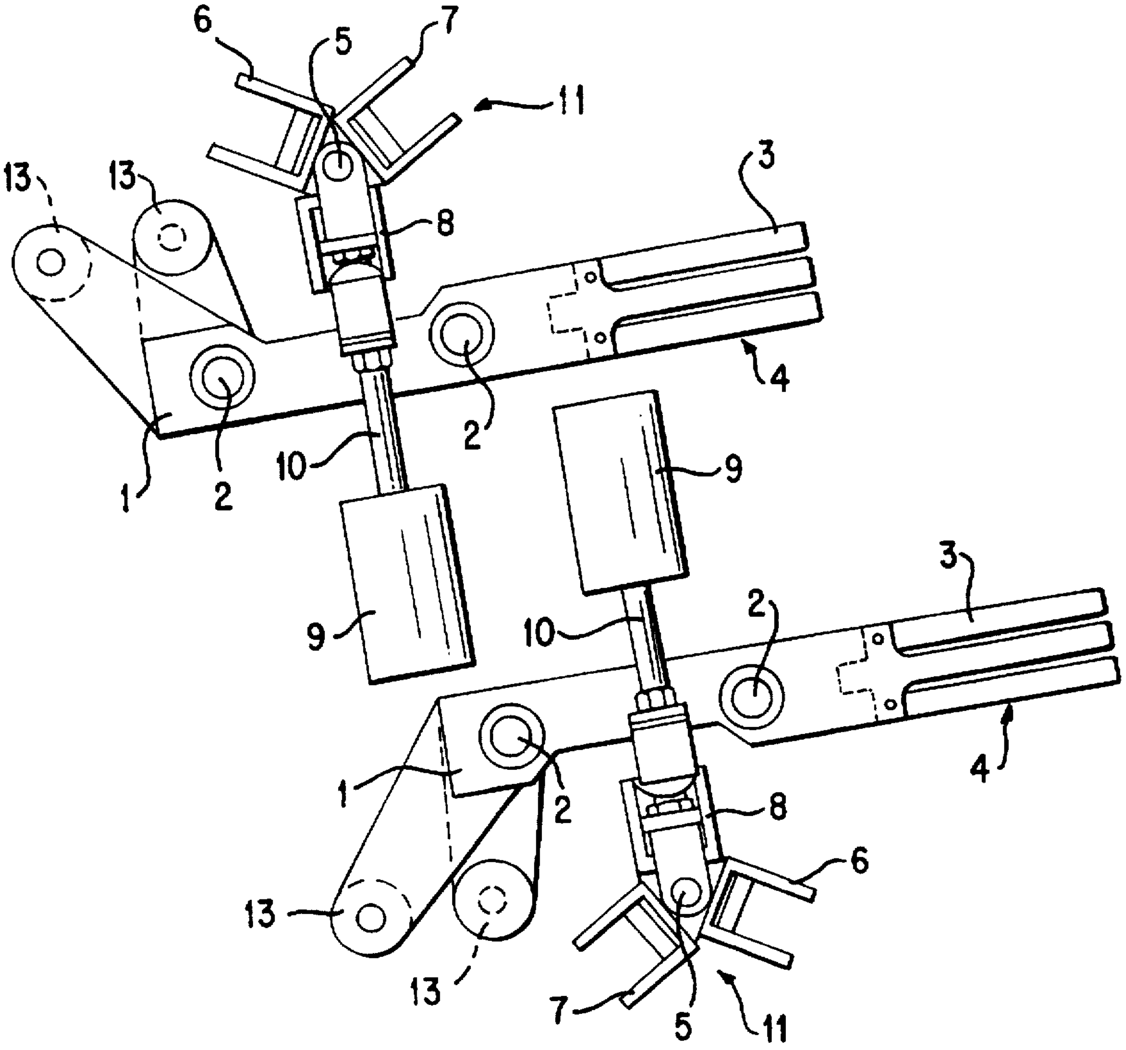
FIG. 2 is an enlarged side view of the details of a portion FIG. 1.

Reference 9 designates an air cylinder for spacing each spacer shaft 5 from the finger holder 1, in which after the piston rod 10 thereof is shifted to cause the spacer shaft 5 to become spaced from the finger holder 1, the spacer shaft 5 is rotated to position anyone of the spacers 6, 7 and 8 in a direction towards the air cylinder 9, and the piston rod 10 is then caused to be spaced further away, thereby making the same spacers be positioned between the finger holders 1. In FIG. 2, such a situation is shown that the row of spacers 8 is about to be positioned between the finger holders 1.

Figure 3A:
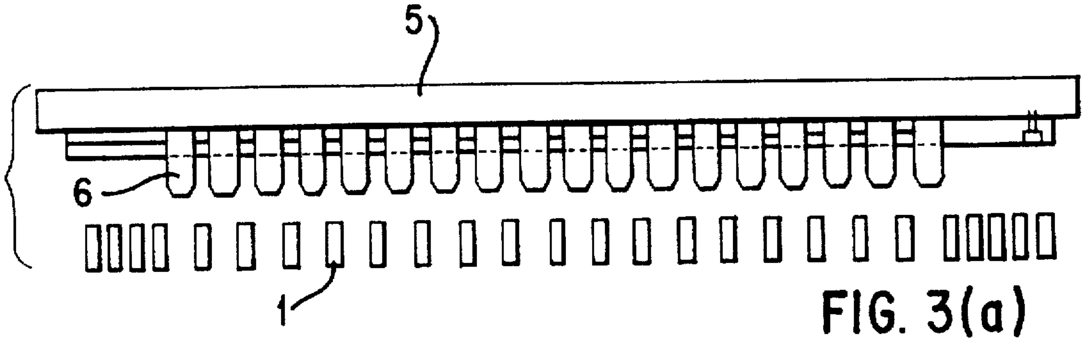
FIGS. 3(*a*)–(*c*) includes front views partially showing the finger interval holding member of FIG. 2, and show the situation using the spacers 6, 7 or 8, respectively.
Figure 3B:
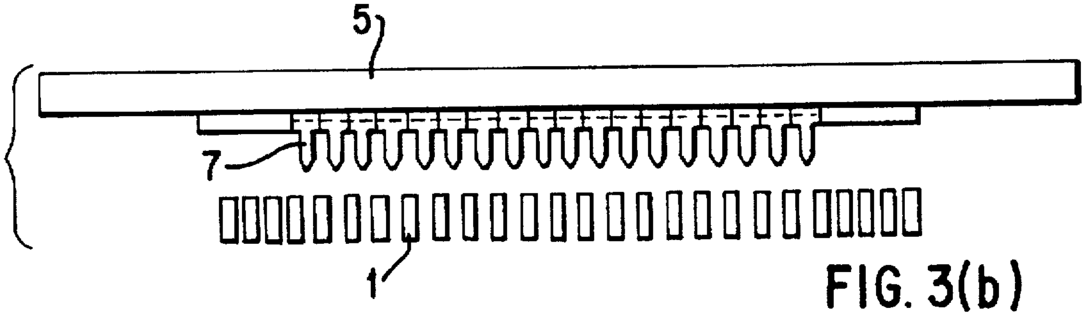
Figure 3C:
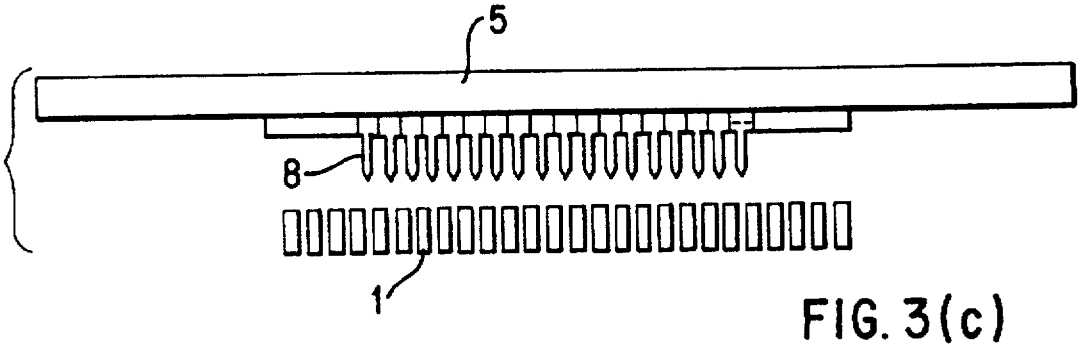

FIGS. 3(*a*)–(*c*) each are front views showing the situations wherein the spacers 6, 7 and 8 of the spacer shaft 5 are directed downward. As shown in FIG. 3(*a*), the row of spacers 6 consists of spacers 6 having a width for positioning the finger holders 1 so that the intervals of the endless blades B are maintained so as to slice a loaf of bread, for instance, with four slices per pound. FIG. 3(*b*) shows the spacers 7 having a positioning width for the finger holders 1 so that a loaf of bread can be sliced, for instance, with six slices per pound. Also FIG. 3(*c*) shows the spacers 8 having a positioning width for the finger holders 1 so that a loaf of bread can be sliced with eight slices per pound. The rows of these spacers 6–8 and the spacer shaft 5 constitute a finger interval holding member 11.

Figure 4:
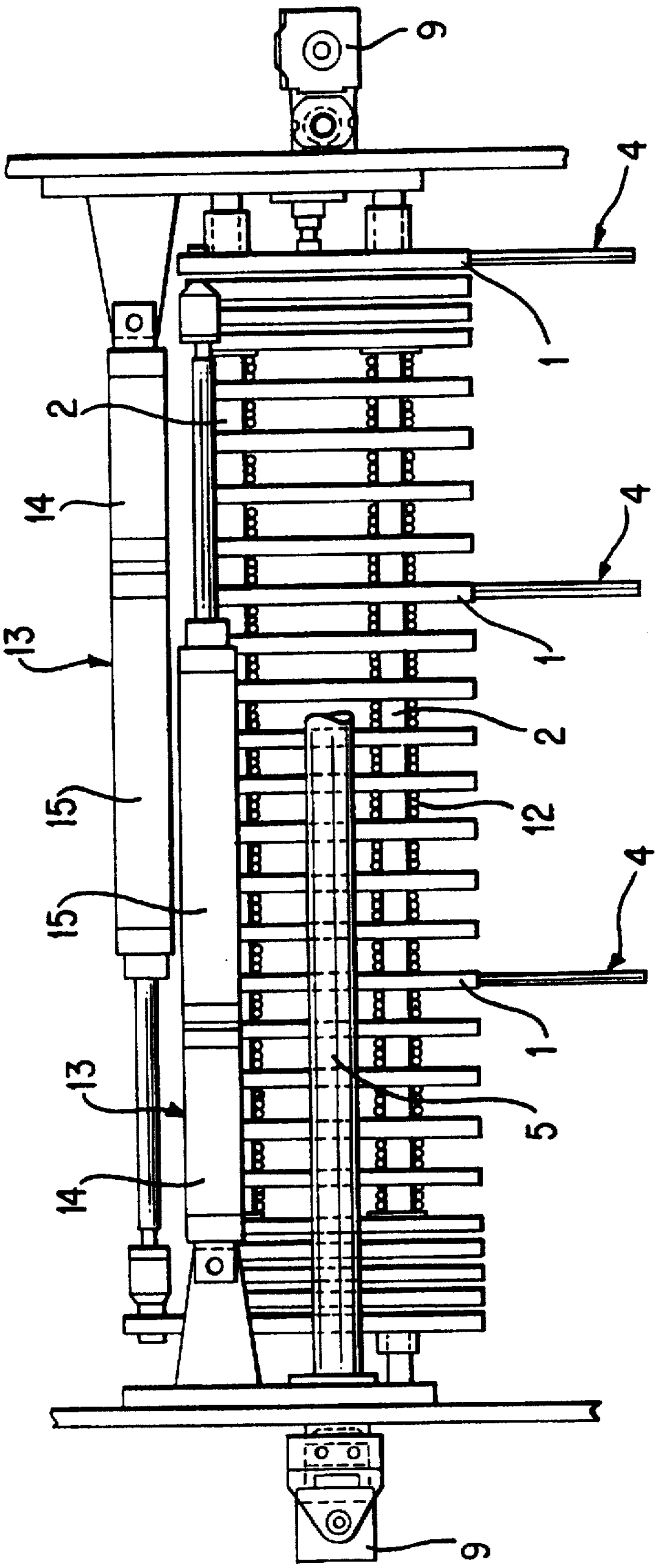
FIG. 4 is a partial plan view of FIG. 2.
Figure 5:
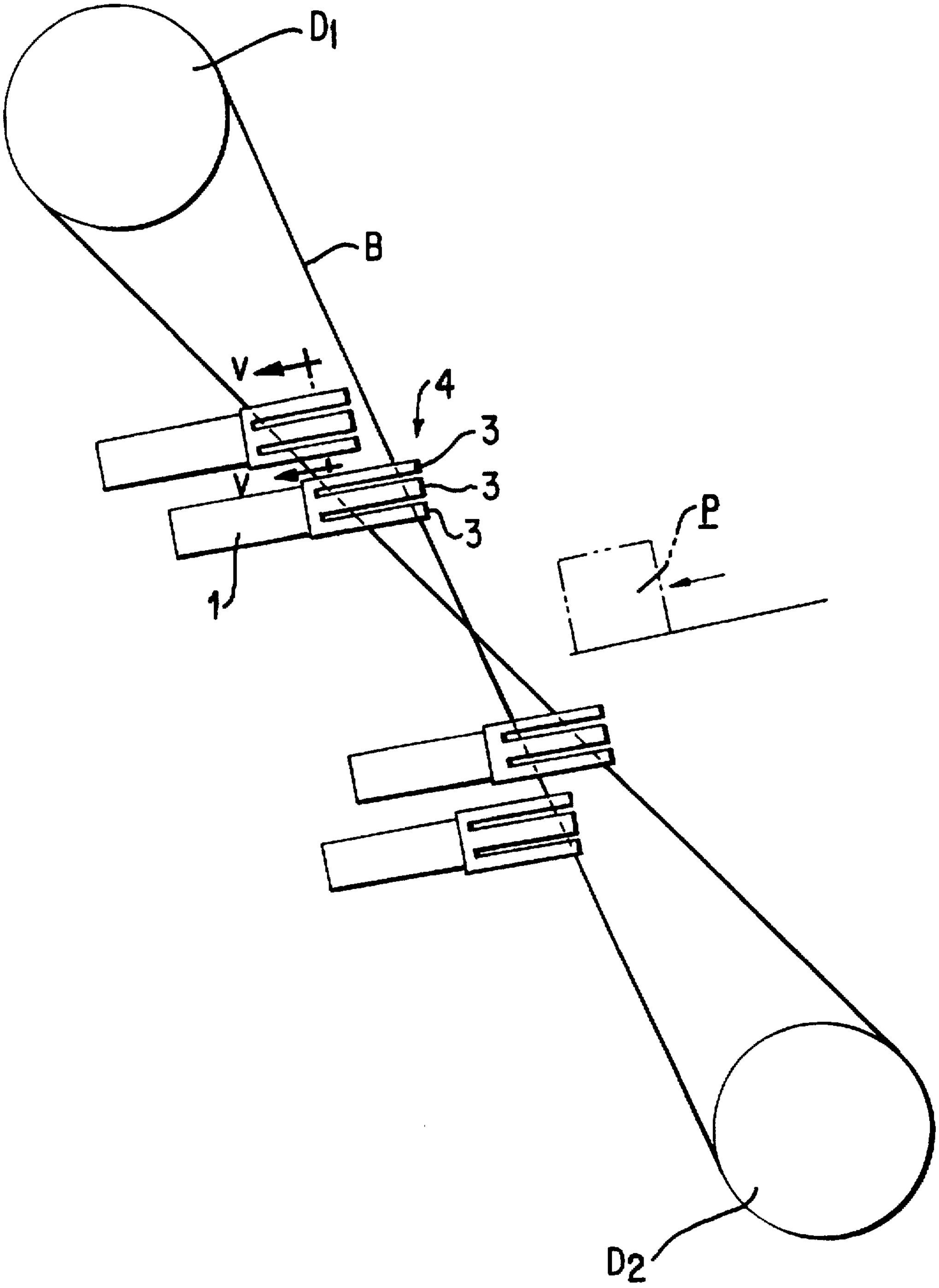
FIG. 5 PRIOR ART
FIG. 5 is a side view showing the construction of a bread slicer using endless blades.
Figure 6:
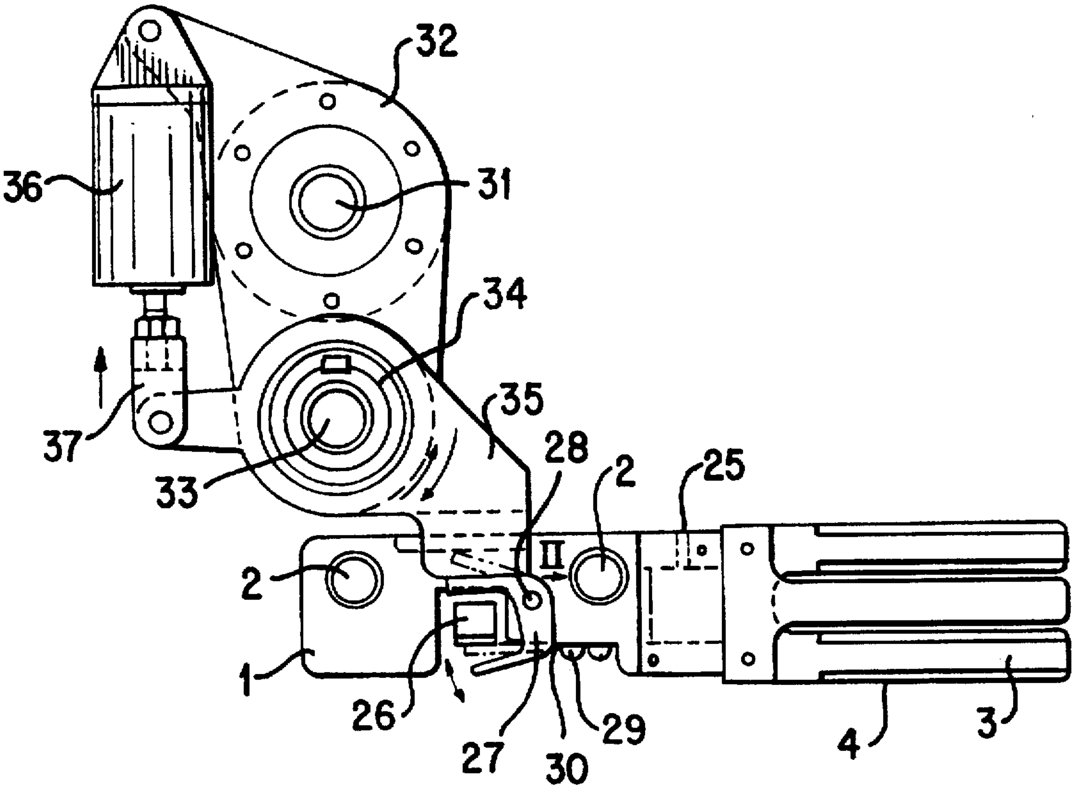
FIG. 6 PRIOR ART
FIG. 6 is a side view showing the finger holder positioning device of the prior art.

As shown in FIG. 4, on the other hand, the finger holders 1, except for those located at both ends, are located on the guide bars 2, with a coil spring 12 inserted between the adjacent holders. Accordingly, the respective finger holders 1 are positioned by the expanding force of the coil springs 12 so that the adjacent holders are spaced almost at equal intervals. Reference 13 indicates air cylinders constituting a finger holder fixing device, each made as a two-stage cylinder comprising a small-stroke air cylinder 14 and a large-stroke air cylinder 15. The piston rods of these air cylinders 13 are connected to the terminal ones of the finger holders 1 put on the guide bars 2, wherein the interval between the finger holders 1 is changed by the expansion and contraction of these air cylinders 13.

Under the condition where the air cylinders 14 are expanded and the air cylinders 15 are contracted, the finger holders 1 assume the situation shown in FIG. 3(*b*) to provide an interval for slicing a loaf of bread to six slices per pound. If the spacers 7 are inserted between the finger holders 1 under this situation and the air cylinders 13 are contracted as a whole, the finger holders 1 will be clamped as uniformly held so as to have the width of the spacers 7.

In a situation where the air cylinders 15 are expanded and the air cylinders 14 are contracted, the finger holders 1 maintain an interval for providing four slices, as shown in FIG. 3(*a*). If the spacers 6 are inserted between the finger holders 1 and the air cylinders 13 are contracted as a whole, the finger holders 1 will be clamped and uniformly held with an interval providing four slices that corresponds to the width of the spacers 6.

Furthermore, if the spacers 8 are inserted between the finger holders 1 and the air cylinders 13 are contracted after both the air cylinders 14 and 15 are properly contracted to a location providing an interval somewhat wider than an interval for providing eight slices, as shown in FIG. 3(*c*), the finger holders 1 will be clamped and uniformly held with spacing corresponding to the width of the spacers 8.

For simple illustration of the structure, in FIG. 4, the finger holders 1 are shown with only three fingers 4 attached thereon and the spacer shaft 5 is shown with no spacers.

As to the attachment of the spacers 6–8 to the spacer shaft 5, on the other hand, they are put thereon, not fixed, but instead with a looseness such that they can be slightly moveable on the spacer shaft 5. When the spacers 6–8 are inserted between the finger holders 1 and clamped by the air cylinders 13, however, the finger holders 1 are accurately held at equal intervals depending on the width of the spacers 6–8. The rotation of the spacer shaft 5 at interval of 120° for switching over the rows of the spacers 6–8 may be done by hand or automatically.

Although the bread slicer illustrated in the drawings has twenty-six finger holders 1 which guide twenty-five endless blades in order to slice three pounds of bread to a maximum of eight slices per pound, four finger holders at one end and five finger holders at the other end will be used only in the slicing for providing eight slices and they are therefore fixed at an interval for providing eight slices. Only at a position between the remaining finger holders 1 in the middle, a coil spring 12 is located, whereby the intervals of these finger holders can be changed. Owing to the aforementioned construction, the length of the spacer shaft 5 becomes shorter and therefore, the width of the bread slicer is made smaller.

In this preferred embodiment, moreover, the finger holders at both ends sides are used only when a loaf of bread is sliced to the maximum number of bread slices, i.e. eight bread slices, which include the four finger holders at one end and five finger holders at the other end, and may a united structure as the finger holders having an interval for providing the maximum number of bread slices, and these finger holders in the united structure may be constructed so as to move like one finger holder when the interval regulating operation of finger holders is carried out. Thus, the bread slicer can be simplified in structure and operation.

If the finger holders 1 are held at intervals somewhat larger than an interval for providing a desired number of bread slices by means of the air cylinders 13, an interval nearly equal to the desired number of bread slices will be formed between the respective finger holders 1 because all the coil springs 12 are uniform. Owing to the fact that the minimum interval necessary for insertion of a spacer is formed between the adjacent finger holders 1 as mentioned above, a quick setting of the finger holders 1 can be carried out, with the clamping stroke of the air cylinders 13 made smaller, after spacers corresponding to that desired number of bread slices are made to intervene therebetween.

Although the present invention has been concretely described in connection with the illustrated preferred embodiment, it is a matter of course that various modifications can be made in contour and structure to the present invention, not limited to the embodiment, without departing from the scope of the present invention described in the appended claims. In the above preferred embodiment, for instance, three rows of spacers are provided every at a position of 120° on the spacer shaft 5, but the number of the rows of spacers and the attaching angle of spacers on the spacer shaft 5 may be freely selected.

In the illustrated apparatus, moreover, three rows of spacers are provided and in order to switch over the row of spacers to be used, the spacer shaft 5 is shifted by the air cylinder 9 so as to be rotated at a place where it does not collide with the finger holders 1, but a construction may be adopted such that the spacer shaft 5 is turned, not shifted, depending on the structure and contour of spacers used and the number of rows of these spacers. In addition, different kinds of spacer shafts on which spacers having various widths are attached may be provided and substituted.

As has been concretely described above, the bread slicer according to the present invention comprises springs, respectively made to intervene between the finger holders holding fingers for guiding endless blades, each of which biases the adjacent finger holders so as to separate them from each other, a finger interval holding member having rows of plural spacers which differ in width from one another which are attached on a rotatable spacer shaft and held between the adjacent finger holders so as to maintain the mutual intervals of the finger holders, and a finger holder fixing device for clamping the finger holders from both the sides. By clamping the finger holder fixing device, accordingly, a nearly equal interval can be respectively provided between the finger holders by the action of the springs. By making a row of spacers attached on the spacer shaft intervene in said interval and by clamping the finger holders from both the sides by means of the finger holder fixing device, the finger holders are positioned apart corresponding to at the interval between the spacers accurately and quickly.

According to the present invention, there is therefore provided a bread slicer in which changing of the number of bread slices can be easily and quickly carried out with the desired accuracy.

In the bread slicer in which some of the finger holders at both ends are used only for providing the maximum number of bread slices are made up in a united structure, according to the present invention, there can be further obtained such effects of simplifying the structure of the finger holders and the operation for changing the intervals of the finger holders, in addition to the aforementioned effects.

What is claimed is:

1. A bread slicer which comprises:

a plurality of endless blades mounted on the bread slicer and stretched over two spaced drums.

a plurality of fingers respectively attached to a plurality of finger holders:

a plurality of guide bars positioned on the bread slicer parallel to said drums, said guide bars movably supporting and guiding each of said finger holders so as to position the blades, a plurality of springs respectively positioned on at least one of the guide bars and located between the finger holders, each of said strings biasing adjacent finger holders so as to space the adjacent finger holders from each other;

a finder interval holding member mounted on the bread slicer and including a rotatable spacer shaft and rows of spacers positioned on the shaft which differ in width from one another wherein the rotatable spacer shaft is positioned parallel to said guide bars and said spacers are positionable between adjacent finger holders so as to space apart the finger holders so as to have equal intervals therebetween; and a finger holder fixing device mounted on the bread slicer and clamping the finger holders from opposite sides of the finger holders wherein an air cylinder is mounted on the bread slicer, said air cylinder moving said spacer shaft towards and away from the finger holders.

2. A bread slicer as claimed in claim 1, wherein said spacers are mounted on said spacer shaft.

3. A bread slicer as claimed in claim 1, wherein said spacers are attached to the spacer shaft at intervals of 120° from one another, and have three different widths respectively.

4. A bread slicer as claimed in claim 3, wherein said air cylinder is connected to at least one of the finger holders.

5. A bread slicer as claimed in claim 3, wherein said finger holders have ends supported on said guide bars and said finger holders are held with intervals therebetween so as to provide a maximum number of bread slices and said finger holders are displaceable as a single body.

* * * * *